United States Patent [19]

Dvorzsak

[11] Patent Number: 4,736,109

[45] Date of Patent: Apr. 5, 1988

[54] CODED DOCUMENT AND DOCUMENT READING SYSTEM

[75] Inventor: Anthony P. Dvorzsak, Mount Prospect, Ill.

[73] Assignee: Bally Manufacturing Company, Chicago, Ill.

[21] Appl. No.: 896,424

[22] Filed: Aug. 13, 1986

[51] Int. Cl.$^4$ .......................... G06K 7/10; G06K 9/32
[52] U.S. Cl. ..................... 250/566; 235/456; 235/464; 235/471; 235/494; 250/569; 382/48
[58] Field of Search ............... 250/566, 568, 569; 235/454, 456, 458, 459, 460, 485, 494, 464, 470, 471; 382/44–46, 48

[56] References Cited

U.S. PATENT DOCUMENTS

| | | |
|---|---|---|
| 3,058,093 | 10/1962 | Vernon et al. |
| 3,603,728 | 9/1971 | Arimura ............................. 382/48 |
| 3,693,154 | 9/1972 | Kubo et al. ......................... 382/48 |
| 3,801,775 | 4/1974 | Acker .................................. 382/46 |
| 4,091,394 | 5/1978 | Kashioka et al. |
| 4,115,805 | 9/1978 | Morton . |
| 4,115,806 | 9/1978 | Morton . |
| 4,130,243 | 12/1978 | Stevens ............................... 235/487 |
| 4,298,859 | 11/1981 | Feilchenfeld ....................... 235/456 |
| 4,300,123 | 11/1981 | McMillin et al. ................... 235/456 |
| 4,357,596 | 11/1982 | Feilchenfeld . |
| 4,388,610 | 6/1983 | Tsunekawa . |
| 4,495,491 | 1/1985 | Postl . |
| 4,504,969 | 3/1985 | Suzuki et al. |
| 4,513,442 | 4/1985 | Scherl . |
| 4,516,266 | 5/1985 | Christopher et al. |
| 4,545,070 | 10/1985 | Miyagawa et al. |
| 4,566,125 | 1/1986 | Clunn . |
| 4,566,126 | 1/1986 | Miyagawa et al. |

*Primary Examiner*—Edward P. Westin
*Attorney, Agent, or Firm*—Mason, Kolehmainen, Rathburn & Wyss

[57] ABSTRACT

A coded document is provided for use in a document reading system having a plurality of markable areas defined thereon and a first and second coded pattern disposed in predetermined relation to the markable areas. Each of the coded patterns has an identical predefined signature when viewed from any direction. A coded document reader includes a video camera that captures the image carried on the coded document. Pixel data is stored in a memory corresponding to the document area scanned by the video camera. The stored data is analyzed to identify detected signatures corresponding to the coded pattern signatures. Based on the location of the identified detected signatures and stored data defining the positions of the markable locations relative to the coded patterns, the position within the stored data of each of the markable locations on the card is determined.

12 Claims, 3 Drawing Sheets

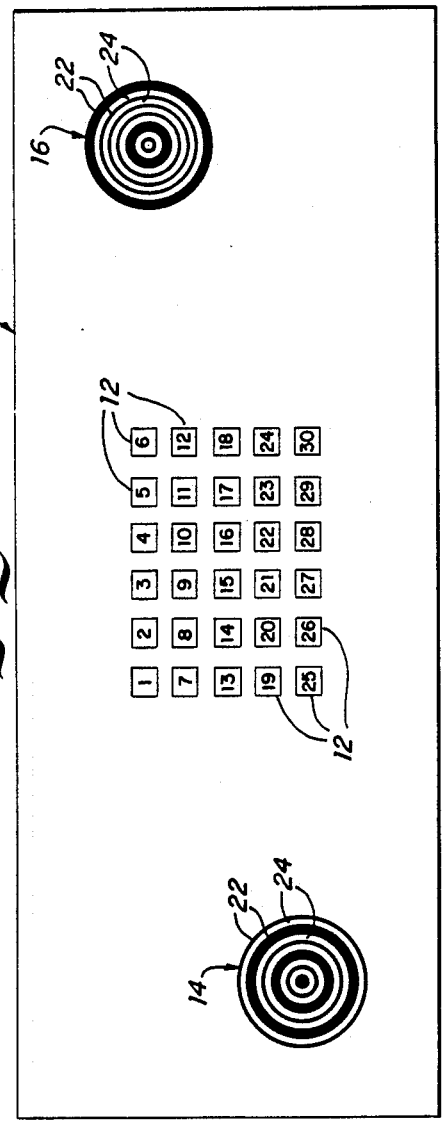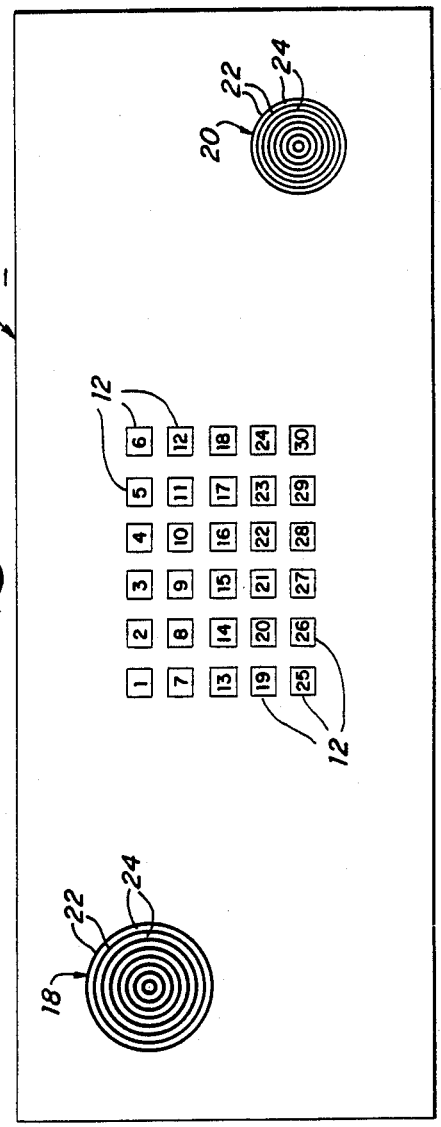

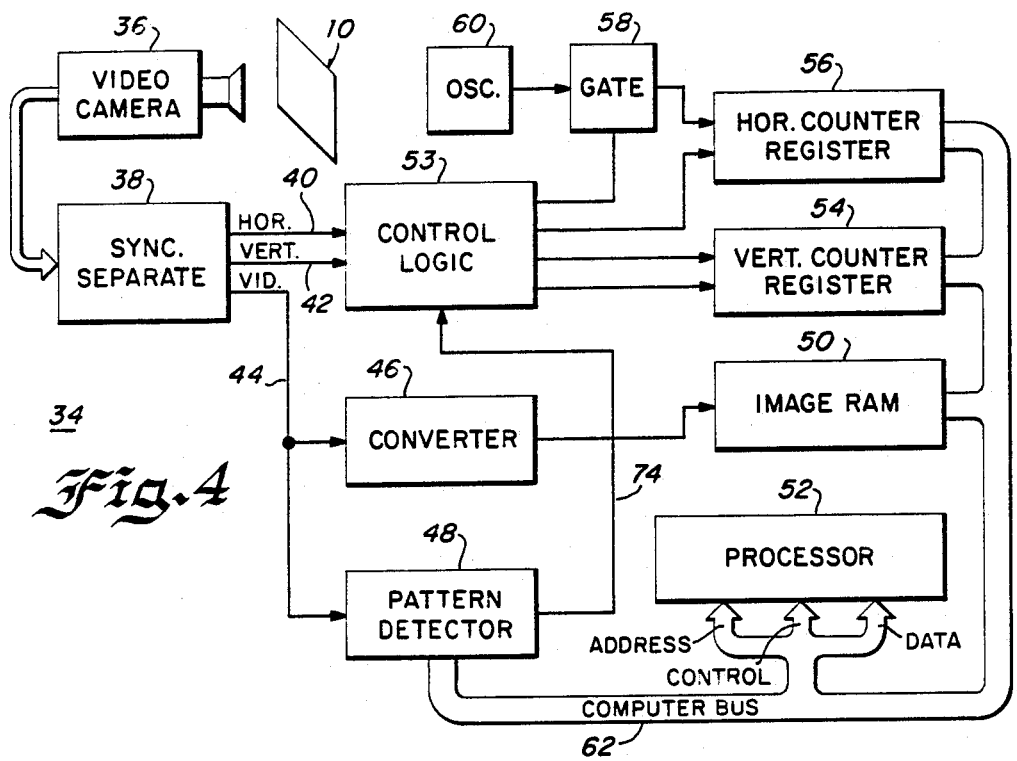
*Fig. 4*
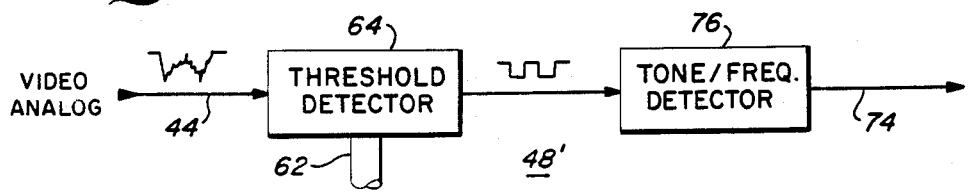
*Fig. 5*
*Fig. 6*

CODED DOCUMENT AND DOCUMENT READING SYSTEM

BACKGROUND OF THE INVENTION

1. Field of the Invention

This invention relates generally to coded documents and document reading systems, and more particularly to an improved coded document of the type that have markable areas located thereon wherein each of the markable areas contains a plurality of markable locations that may be selectively marked by a writing instrument and an improved card reading system used therewith.

2. Description of the Prior Art

Readers for reading manually marked cards are known in the art. U.S. patent application Ser. No. 848,665, filed Apr. 4, 1986 and assigned to the same assignee as the present application, discloses an optical card reader that is useful for reading marks made on the face of a preprinted card utilizing a video camera and a memory device to capture and store an image of at least a portion of the card. This reader utilizes positioning indicia printed on the card by determining the centroid of the positioning indicia and identifying markable areas relative to the determined centroids. Although this optical card reader is useful for its intended purpose a need exists for an improved coded document and document reading system that enables reduced processing time.

SUMMARY OF THE INVENTION

Among the important objects of the present invention are to provide both a new and improved coded document and document reading system and more particularly, a new, improved, efficient and reliable document reading system that minimizes processing time required to determine the orientation of the coded document.

In brief, in accordance with the above and other objects of the invention, there is provided a coded document for use in a document reading system having a plurality of markable areas defined thereon and a first and second coded pattern disposed in predetermined relation to the markable areas. Each of the coded patterns has an identical predefined signature when viewed from any direction. An alternative coded document arranged in accordance with the invention includes a first and second coded pattern with each having an identical predefined signature when viewed from any direction within a predefined range.

Further in accordance with the preferred embodiment of the invention, a document reading system includes a video camera that captures the image carried on the coded document. Pixel data is stored in a memory corresponding to the document area scanned by the video camera. The stored data is analyzed to identify detected signatures corresponding to the coded pattern signatures. Based on the location of the identified detected signatures and stored data defining the positions of the markable locations relative to the coded patterns, the position within the stored data of each of the markable locations on the card is determined.

DESCRIPTION OF THE DRAWING

These and other objects and advantages of the present invention will become readily apparent upon consideration of the following detailed description and attached drawing wherein:

FIG. 1 is a plan view of a coded document arranged in accordance wih the features of the invention;

FIG. 2 is a plan view of an alternative embodiment of the coded document arranged in accordance with features of the invention;

FIGS. 3A-3D provide a graphic illustration of a signature for each of a pair of coded patterns carried on the coded documents of FIGS. 1 and 2;

FIG. 4 is a block diagram of a coded document reader according to the present invention;

FIG. 5 is a block diagram of a pattern detector of the coded document reader of FIG. 4;

FIG. 6 is a block diagram of an alternative embodiment of a pattern detector of the coded document reader of FIG. 4;

DETAILED DESCRIPTION

Figure 7:
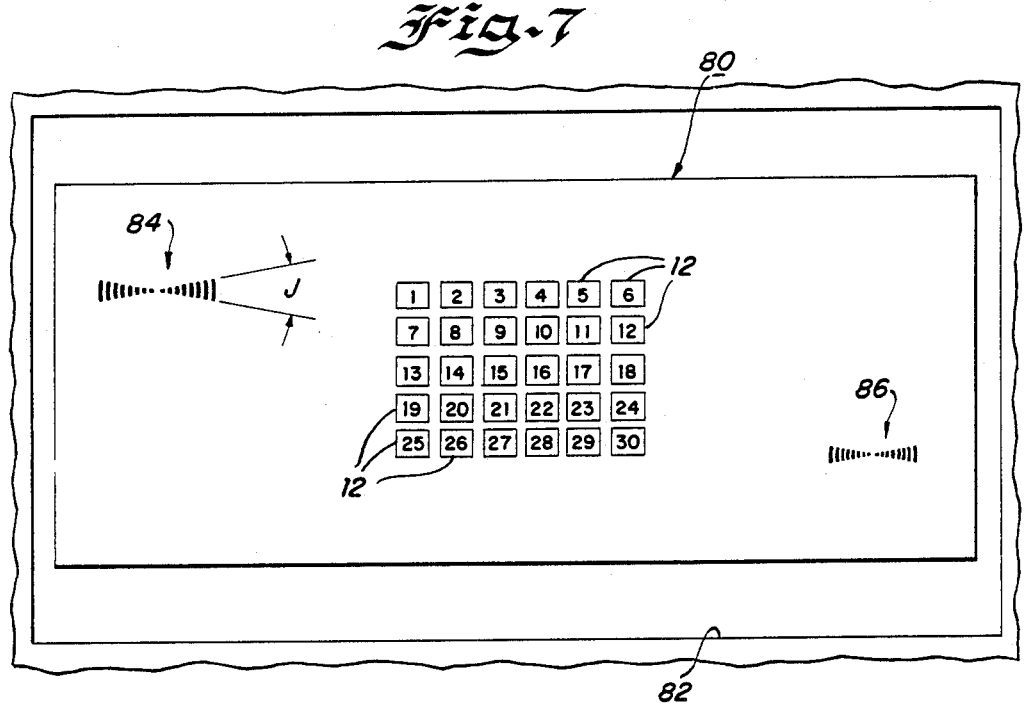
FIG. 7 is a plan view of a different alternative embodiment of the coded document arranged in accordance with features of the invention.

Referring now to FIGS. 1 and 2, there is shown a first and a second coded document designated generally by the reference numerals 10 and 10' arranged in accordance with features of the invention. Each of the cards 10 and 10' has a markable area containing a plurality of markable locations 12 that are selectively marked with a pencil or other writing instrument to indicate selected data. Each of the cards 10 and 10' includes a first and second coded pattern designated as 14 and 16 on card 10 and 18 and 20 on card 10'. The coded patterns 14 and 16 and 18 and 20 of the cards 10 and 10', respectively, are disposed in predetermined relation to the markable areas 12 so that the markable areas 12 are registered with these coded patterns. The registration between the coded patterns 14 and 16 and markable areas 12 of the card 10 and coded patterns 18 and 20 and markable areas 12 of the card 10' may be simply achieved by simultaneous printing of the coded patterns and the markable areas. The coded patterns of the cards 10 and 10' are utilized for determining the location of the markable areas 12, avoiding any requirements for registration of the markable areas 12 with an edge of the card.

Each of the illustrated coded patterns 14, 16, 18 and 20 includes areas of a first high level density 22 and a low level density 24. The rectangular numbered indicia 1 through 30, indicating the markable areas 12, is provided with a lower density level than the high level density areas 22 to enable quickly identifying the coded patterns 14 and 16 or 18 and 20 by the use of a threshold detector as is later described.

Each of the coded patterns 14, 16, 18 and 20 is symmetrically configured to provide an identical sequence of alternating high density and low density or white areas 22 and 24 through the center of the coded pattern when viewed from any direction. An advantage of such symmetrical configuration of the coded patterns 14, 16, 18 and 20 is that the coded patterns can be identified without any requirements for physically orienting the card 10 or 10' with respect to a card reading device. Referring to FIG. 3A, there is provided a graphical representation of the centrally disposed sequence of high and white density levels 22 and 24 or a signature 26 of the coded pattern 14. Likewise, FIGS. 3B-3D provide graphical representations of a signature 28, 30 and 32 of the coded patterns 16, 18 and 20, respectively. The signatures 30 and 32 of the coded patterns 18 and 20 include equally spaced first and second density level areas for defining a frequency or clocking feature of the signatures 30 and 32.

Referring now to FIG. 4, there is illustrated a block diagram of a coded document reader designated generally by the reference character 34 and constructed in accordance with the principles of the present invention. A preselected one of the coded document 10 or 10' is scanned by a video camera 36 or other imaging device such as, for example, a charge coupled imaging device (CCD). The analog output signal of the video camera 36 is applied to a synchronization separation circuitry 38 to obtain horizontal and vertical synchronization signals of the analog video signal of the camera 36 that are shown at lines 40 and 42 respectively. The synchronization separation circuitry 38 also outputs on line 44 the analog video signal which in turn is applied to an analog-to-digital converter 46 and a pattern detector 48. The function of the analog-to-digital converter 46 is to provide a digital signal suitable for storage in a memory device 50 such as a random access memory designated here as the image RAM that is used in conjunction with a processor unit 52. A number representative of the relative darkness or density of each pixel of the video image signal is stored together with pixel location data in the image RAM 50. Control logic circuitry 53 receives the horizontal and vertical synchronization signals and provides output signals that are applied to a vertical counter register 54, a horizontal counter register 56 and a gate circuit 58. An oscillator 60 is coupled to the gate 58 to provide clock pulses to be applied to the horizontal counter register via gate 58. The vertical counter register 54 and horizontal counter register 56 provide the pixel location data that is stored with the pixel density data in the image RAM 50. The image RAM 50, the processor unit 52 and pattern detector 48 are connected by a bidirectional computer bus 62 that includes control, address and data buses. As exemplified by the circuit of FIG. 4, the preferred embodiment of the invention utilizes a raster scan method for inputting data representing the coded document 10 or 10' into RAM 50.

Pattern detector 48 utilizes the analog video signal shown at line 44 to identify the signatures 26 and 28 of the coded patterns 14 and 16 of card 10 or alternatively the signatures 30 and 32 of the coded patterns 18 and 20 for the card 10'. A first embodiment of the pattern selector 48 is shown in FIG. 5 and a second embodiment is shown in FIG. 6.

Referring to FIG. 5, a digital pattern detector 48 is illustrated. Pattern detector 48 includes a threshold detector circuit to eliminate video signals below a predetermined threshold. The output of threshold detector 64 is applied to a shift register 66 that receives clock pulses from an oscillator 68. A valid pattern register 70 stores binary data signatures corresponding to the coded patterns carried by one of either the card 10 or 10'. A comparator 72 is coupled to the registers 66 and 70 to repeatedly compare the contents of the registers 66 and 70 for a match. In the preferred embodiment of the invention, a match will occur when the scan line of the video camera 36 traverses the center of coded pattern 14 or 16. When a match is detected, the comparator 72 provides a trigger signal at line 74 that is applied to the control logic 53 for identifying pixel location data of the thus detected signature.

Referring to FIG. 6, a tone detecting pattern detector 48' is illustrated that advantageously may be used with the card 10' with the before described frequency defining signatures 30 and 32. As described with respect to the digital pattern detector 48, a threshold detector 64 is utilized to eliminate the video signals below the predetermined threshold. A tone or frequency detector 76 provides the trigger signal at line 74 for a specific frequency burst corresponding to the signatures 30 and 32 of the coded pattern 18 and 20. The tone detector 76 is tuned to detect the specific frequency of the signature utilized that corresponds to the size and resolution of the coded pattern. The frequency of the signature 30 and 32 will be a function of the scan rate of the video camera 36 and the size and spacings of the elements 22 and 24 of the patterns 30 and 32. A constant tone frequency of a predetermined duration will only occur when the scan line traverses the center of the coded pattern 18 or 20.

The identified pixel location data corresponding to the centers of the detected pattern signatures are used in conjunction with stored data corresponding to the predetermined relation of the coded patterns with the markable areas 12 to identify stored pixel data corresponding to the markable areas 12. The identified markable area pixel data can be utilized by the processor unit 52 to determine which of the markable areas 12 has been marked as described in the previously identified U.S. patent application Ser. No. 848,665.

One of the advantages of the system as described above is that it permits the location of the markable areas 12 regardless of the physical orientation of the card 10, with respect to the video camera 36. Since the coded patterns 14, 16, 18 and 20 are completely symmetrical, the signatures shown in FIGS. 3A-D will be generated regardless of the direction that the video camera 36 is scanning the card 10. It should also be noted that the signatures 30, 32, 34 and 36 will only be generated by the threshold detector 64 when the video camera 36 scan line traverses the center of the coded patterns 14, 16, 18 or 20. It is only at this point that the output of threshold detector 64 will match the predetermined pattern stored in register 70 of FIG. 5 or the predetermined tone in detector 76 of FIG. 6. Thus, the exact orientation of the image of the card 10 stored in the image RAM can be determined.

When a match occurs as indicated by a signal from control logic 53, the signals from horizontal counter register 54 can be used to provide an indication of the location of the pixel representing the center of the coded pattern 14, 16, 18 or 20. As a result, it is possible to use the horizontal and vertical signals of a raster scan type video system to determine the exact pixel location in RAM 50 of the coded patterns 14, 16, 18 and 20 and thereby to permit the processor utilizing coordinate manipulation to identify the locations of the markable areas 12 in the image RAM 50.

Figure 8:
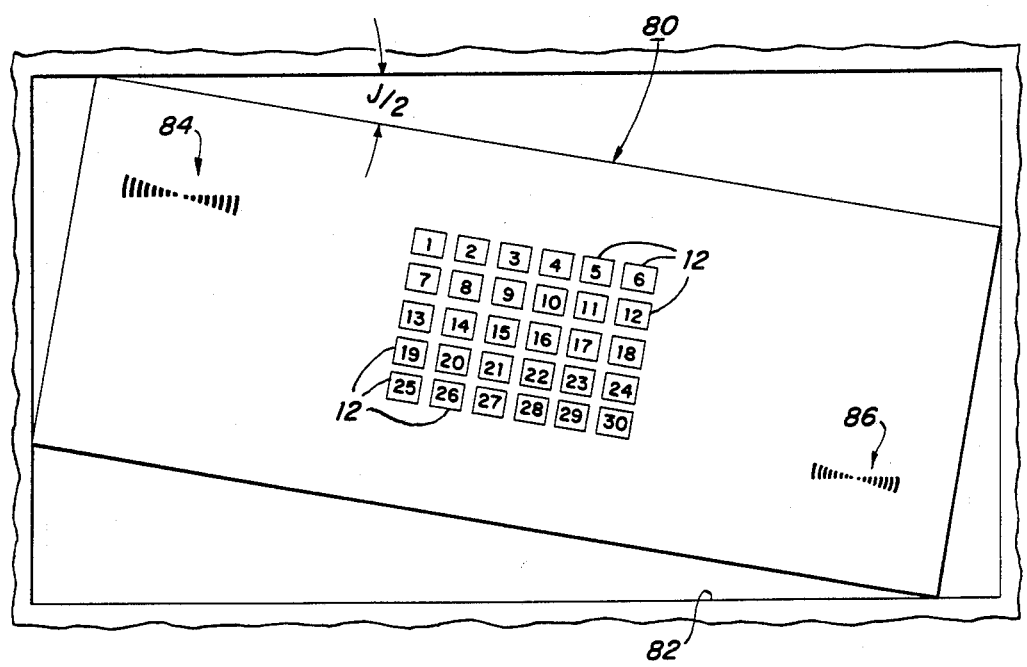
FIG. 8 is a plan view of the coded document of FIG. 7 illustrating a maximum skew of the coded document to be read by the card reader according to the present invention.

Referring now to FIGS. 7 and 8, there is shown an alternative coded document designated generally by the reference numeral 80 that can be used with the coded document reader 34. The coded document 80 is positioned relative to the camera 36 within a frame 82 for limiting the relative rotational orientation of the document 80. A maximum angular rotation or skew of the card 80 within the frame 82, designated as J/2, is illustrated in FIG. 7.

Coded document 80 is similar to coded documents 10 and 10' in that it contains a first and second coded pattern 84 and 86 disposed in predetermined relation to the markable areas 12. However, unlike the cards 10 and 10' that include symmetrically configured coded patterns 14, 16, 18 and 20 that can be identified over a full 360° of rotational orientation of the card 10 and 10' relative to the video camera 36, coded patterns 84 and 86 are symmetrically configured within a predefined range designated as J corresponding to the limited angular rotation of the card 80 relative to the horizontal scan line of the video camera 36.

Each of the coded patterns 84 and 86 include a signature or predefined, identical sequence of high and low density levels 22 and 24 through the center of the coded pattern 84 and 86 when viewed from any direction within the predefined range J. FIGS. 3C and 3D provide graphical representations of the signatures 30 and 32 of the coded patterns 84 and 86, respectively. Also, the range J can be a function of both the degree of rotation of the document 80 with respect to the frame 82 and the tolerances of registration of the markable areas 12 with respect to the edges of the document 80.

In this manner, it is possible to provide for the accurate determination of the orientation of the document 80 while allowing significant tolerance on both the physical constraints of the reader, such as frame 82, and the alignment or registration of the printing on the document 80 with respect to the edges of the document 80.

In accordance with an important aspect of the present invention, evaluation of video image data to identify the presence of a valid mark within the markable areas 12 can be inhibited until only after the signatures 26 and 28 of document 10 or signatures 30 and 32 of document 10' or 80 have been detected. Thus, unnecessary analysis of video image data is eliminated, resulting in substantial saving in processing tme requirements of the processor 52.

What is claimed is:

1. A coded document reader for reading a coded document of the type having a plurality of markable areas defined thereon and a first and second coded pattern disposed thereon in predetermined relation to the markable areas, said coded document reader comprising:
   means for storing a first and second pattern signature corresponding to said coded patterns;
   means for capturing and storing an image carried on said carried document;
   means for detecting stored image signatures corresponding to said stored first and second pattern signatures; and
   means for identifying stored image data of said markable areas responsive to said detected signatures.

2. A coded document reader as recited in claim 1 wherein said means for capturing and storing an image carried on said coded document include a video camera for providing an analog video signal, an analog to digital converter for digitizing said analog video signal and a memory for storing said digitized video signal.

3. A coded document reader as recited in claim 2 wherein said means for detecting signatures corresponding to said stored pattern signatures include threshold detector means for detecting portions of said analog video signal greater than a predetermined threshold level.

4. A coded document reader as recited in claim 2 wherein said means for detecting signatures corresponding to said stored first and second pattern signatures include frequency detecting means for detecting stored image data having at least one predefined frequency corresponding to said stored first and second pattern signatures.

5. A coded document reader as recited in claim 2 wherein said means for storing a first and second pattern signature include register means for storing binary coded data first and second signatures and wherein said means for detecting signatures corresponding to said stored first and second pattern signatures include shift register means for sequentially storing image data and comparator means for comparing said sequentially stored image data with said stored binary coded first and second signatures to identify a match.

6. A coded document reader as recited in claim 2 wherein said means for identifying stored image data of said markable areas responsive to said detected signatures include means for storing data defining said predetermined relation of said first and second coded pattern to said markable areas and program means responsive to said detected signatures and said stored predetermined relation data for identifying stored image data of said markable areas.

7. A coded document reader for reading a coded document of the type having a plurality of markable areas defined thereon and a first and second coded pattern disposed thereon in predetermined relation to the markable areas, said coded document reader comprising:
   means for storing a first and second pattern signature corresponding to said coded patterns;
   means for storing relative position data defining a predetermined relation of said stored first and second signatures and said markable areas;
   means for capturing and storing an image carried on said coded document;
   means for detecting stored image signatures corresponding to said stored first and second pattern signatures; and
   means responsive to both said detected signatures and said stored relative position data for identifying said stored image data corresponding to said markable areas.

8. A coded document reader as recited in claim 7 wherein said means for capturing and storing an image carried on said coded document include a video camera for providing an analog video signal, an analog to digital converter for digitizing said analog video signal and a memory for storing said digitized video signal.

9. A coded document reader as recited in claim 8 wherein said means for detecting signatures corresponding to said stored pattern signatures include threshold detector means for detecting portions of said analog video signal greater than a predetermined threshold level.

10. A coded document reader as recited in claim 8 wherein said means for detecting signatures corresponding to said stored first and second pattern signatures inlude frequency detecting means for detecting stored image data having at least one predetermined frequency corresponding to said stored first and second pattern signatures.

11. A coded document reader as recited in claim 8 wherein said means for storing a first and second pattern signature include register means for storing binary coded data first and second signatures and wherein said means for detecting signatures corresponding to said stored first and second pattern signatures include shift register means for sequentially storing image data and comparator means for comparing said sequentially stored image data with said stored binary coded first and second signatures to identify a match.

12. A coded document reader as recited in claim 8 wherein same means for identifying stored image data of said markable areas responsive to said detected signatures include means for storing data defining said predetermined relation of said first and second coded pattern to said markable areas and program means responsive to said detected signatures and said stored predetermined relation data for identifying stored image data of said markable areas.

* * * * *